Aug. 25, 1953 G. A. BRACE 2,650,113
FILTER ADAPTER
Filed June 5, 1948 2 Sheets-Sheet 1

INVENTOR.
George A. Brace
BY
Harry S. Demarse
ATTORNEY.

Aug. 25, 1953
G. A. BRACE
2,650,113
FILTER ADAPTER
Filed June 5, 1948
2 Sheets-Sheet 2
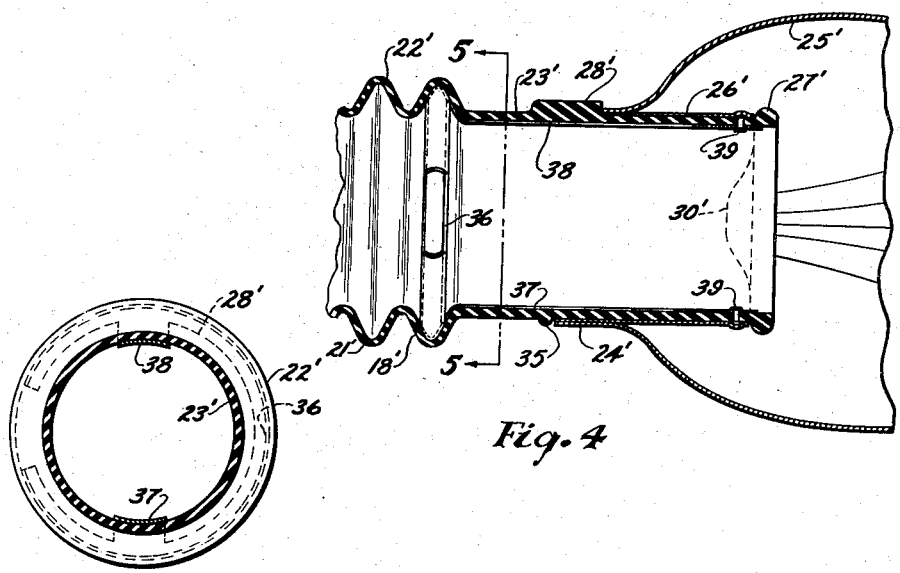
Fig. 4
Fig. 5
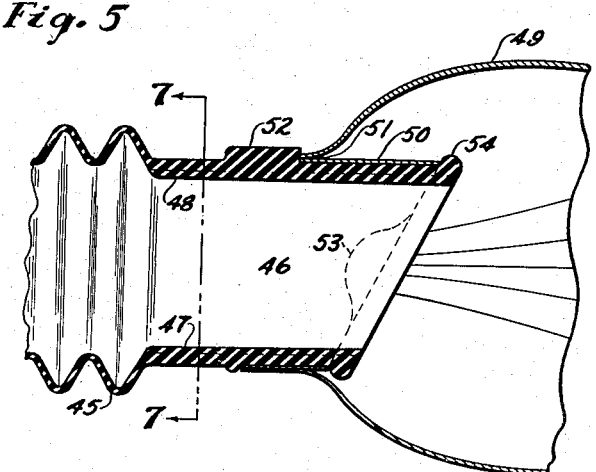
Fig. 6
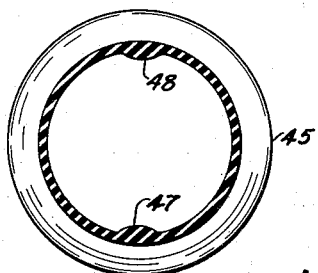
Fig. 7
INVENTOR.
George A. Brace
BY
Harry S. Rumore
ATTORNEY.

Patented Aug. 25, 1953

2,650,113

UNITED STATES PATENT OFFICE 2,650,113

FILTER ADAPTER

George A. Brace, Highland Park, Ill., assignor to The Hoover Company, North Canton, Ohio, a corporation of Ohio Application June 5, 1948, Serial No. 31,320

8 Claims. (Cl. 285—90)

The present invention relates to suction cleaners in general and particularly to a novel filter construction and a novel means for attaching a filter bag to the exhaust outlet of a suction cleaner. More specifically the invention comprises a simple, low-cost, highly effective, self-clamping bag coupling and a novel filter bag especially designed for use with the coupling.

Dirt separators of modern vacuum cleaners employ paper filter bags enclosed in protective fabric bags of suitable material. The life of filter papers can be greatly prolonged if they are not flexed repeatedly at the same point. Excessive flexing is most likely to occur at the inlet end of the bag particularly if it is rigidly attached to the outlet end of the cleaner discharge passageway, as is common in connection with cloth filter bags. To minimize flexing at this point, it has been proposed to connect the inlet of the paper filter to a flexible extension of the exhaust air passageway. The use of such an extension, however, has presented a troublesome problem as respects light weight means for quickly attaching and detaching the paper bag to this flexible tube in a dirt and air tight manner.

One of the prior constructions for accomplishing this end is disclosed in United States Patent No. 2,405,170 granted to Troxler. The coupling therein disclosed is satisfactory as respects the assembly of the paper filter upon the flexible tube. However, the filter is not easily removable because no means is provided for collapsing the self-clamping seat thereof other than by pressing down upon the bag neck itself.

The present invention provides a filter adapter structure designed to overcome entirely the deficiencies of previous couplings as well as a low cost, disposable filter having various features of novelty as will appear more fully below.

With the foregoing introductory matter, the details of the invention will now be described in connection with the accompanying drawings in which:

Figure 4 is a sectional view through a modified form of the adapter;

Figure 5 is a cross sectional view on the line 5—5 of Figure 4;

Figure 6 is a vertical sectional view through a third embodiment of the invention; while Figure 7 is a cross sectional view on the line 7—7 of Figure 6.

Figure 1:
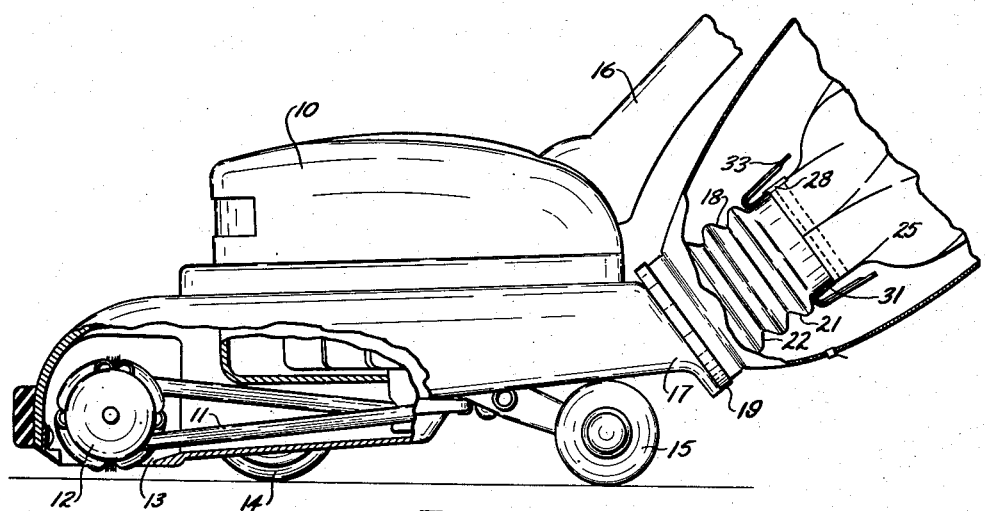
Figure 1 is a side elevational view of a suction cleaner incorporating the preferred embodiment of the invention.
Figure 3:
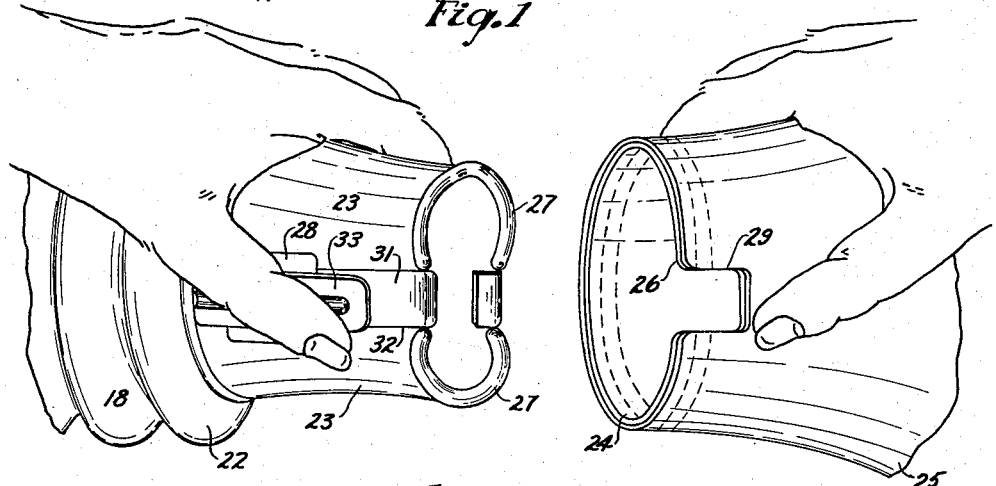
Figure 3 is a fragmentary view showing the manner in which an operator applies or withdraws a filter.
Figure 2:
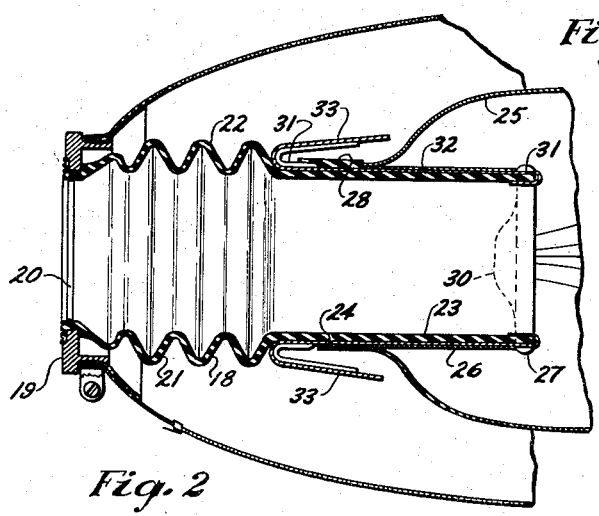
Figure 2 is a vertical sectional view through the novel filter adapter.

Referring now more particularly to Figures 1, 2 and 3 the first embodiment will be described in detail. As illustrated in Figure 1, the invention may be applied to any conventional type of ambulatory cleaner such as that indicated at 10. The cleaner shown is of the type having a vertically mounted motor-fan unit connected by a belt 11 to drive a rotary agitator 12 located lengthwise of the usual suction nozzle 13. The cleaner body is mounted upon a pair of front carrier wheels 14 and one or more rear wheels 15. A pivoted handle 16 connected to the cleaner casing serves to propel the cleaner over the surface being cleaned.

Removably connected to the exhaust passageway 17 of the cleaner is the bag adapter and coupling device indicated as a whole by the numeral 18. This adapter comprises a bag ring 19 which is so formed as to be readily attached to or detached from the end of the exhaust passageway by suitable connectors not shown. Securely mounted to the ring, as by a split spring 20, is a flexible tube 21 made of soft rubber, a suitable plastic or other equivalent flexible resilient material. The end of tube 21 adjacent the bag ring is preferably formed as a bellows 22 while the free end 23 is of substantially smooth tubular form. The free end 23 may also be of frusto-conical form if so desired, and is preferably somewhat thicker than the remaining portion for a purpose described below.

This thickened end of tube 23 serves as the seat and self-clamping coupling for the inlet end 24 of a filter bag 25. The filter bag is preferably made of air pervious paper or the like material which is inexpensive and disposable after it has become filled with dirt. The inlet end of the bag 24 has secured thereto a tube of rather stiff material such as stiff paper having an internal diameter only slightly less than the normal external diameter of tube 23. It will therefore be apparent that after the inlet end of the bag has been slid over the end of tube 23 the normal resiliency of the tube will cause it to expand firmly against the inlet neck and particularly tube 26 so as to clamp the bag tightly in place in an airtight manner. To prevent accidental removal of the filter, it is desirable that the inner end of tube 23 carry a raised bead 27 against which tube 26 abuts to lock the filter in place.

To facilitate proper placement of the bag neck on the adapter seat, the latter may be provided on its upper surface with a projection 28 which interfits with a notch 29 in the peripheral edge of the bag neck. The projection serves as a key preventing rotation of the bag as well as a stop. By inserting the neck until projection 28 is fully seated in the notch, the user is assured that the neck is properly seated and that the inner end of tube 26 is flush with the inner edge of bead 27. As indicated by dotted lines at 30 in Figure 2, the opposite side portions of tube 26 are cut away slightly for a purpose to be explained below.

The diametrically opposed sides of tube 23 carry a pair of U-shaped metallic strips, the longer legs 31 of which extend along the side of the tube and lie in grooves 32 formed in tube 23. The shorter legs 33 lie generally parallel to and spaced from the outer wall of tube 23, as indicated in the drawings. The strips may be secured to the tube 23 in any suitable manner. Legs 33 form a hand grip which, as more clearly indicated in Figure 3, may be readily grasped between the thumb and fingers of an operator. Upon pressing the grips toward one another as indicated in Figure 3, the longer legs 31 collapse or deform the side wall of tube 23. The reduction in the cross-sectional area of the tube makes it a simple matter to insert the inlet neck 24 of the filter thereover. Since the hand grips 33 are spaced appreciably from the outer walls of the tube, the neck of the bag is afforded adequate room for insertion over the tube. Release of the hand grips allows resilient tube 23 to assume its normal tubular condition in which it firmly grips the inlet of the filter and, in particular, collar 26 attached thereto.

The bag may be readily removed by collapsing the adapter by means of the hand grips and then withdrawing the bag axially. In this operation, it will be observed that the inner end of tube 26 is cut-away only at the sides and not at the portions overlying the adjacent inner ends of straps 32. Collapse of tube 23 at these straps allows the non-cut-away portions of tube 26 to override bead 27. The cammed edges of notches 30 also act as pilots to guide tube 26 over the bead as it is withdrawn.

Seat portion 23 of the adapter extends into the filter sufficiently to provide a dirt trap at the lower end of the filter as will be apparent from the drawings. The air stream maintains a central passage free of dirt which tends to collect in the trap and to extend as an annulus above the outlet end of the adapter. The adapter can of course be shortened or lengthened to provide as large or as small a dirt trap as is found desirable in any particular cleaner design.

Another embodiment of the invention is illustrated in Figures 4 and 5 which differs from the preferred embodiment primarily in the means employed to facilitate placement and removal of the filter. The outer end 23' of the adapter is formed in the same manner as just described in connection with Figures 1 to 3. Its inner end is formed as a bellows 22', while its outer end may be provided with a raised circular bead 27' against which the inner edge of sleeve 26' secured to the inlet neck 24' of filter 25' seats. A similar bead 35 may be carried by tube 23' which together with projection 28' serves as a forward stop for the neck of the filter.

The means employed for deforming the filter seating portion of the adapter is shown as comprising a split ring 36 of spring steel or other suitable resilient material formed to be carried firmly within the last convolution of bellows 22' in the manner shown in Figure 4. Carried at diametrically spaced points on this ring are two narrow strips 37, 38 shaped to lie along the inner surface of tube 23'. The outer end of these strips may be attached to the sleeve as by rivets 39. While the ends of ring 36 are shown as spaced apart they may be formed to interlock and provide a more rigid support for the rear ends of strips 37, 38.

When desiring to insert or remove the filter it is merely necessary for the user to grasp tube 23' at a point rearward of the bag neck and press strips 37 and 38 toward one another to collapse the tube in very much the same manner as illustrated in Figure 3. In this operation, ring 36 acts as a support about which strips 37, 38 pivot or flex as pressure is applied to the strips. Cut-away portions 30' of tube 26' are diametrically opposed at points between the ends of strips 37, 38 and serve to facilitate removal of tube 26' over bead 27' in the same manner discussed in connection with the first described embodiment.

A further embodiment is illustrated in Figures 6 and 7. In this form, the adapter comprises a resilient bellows 45 similar to bellows 22 and 22'. Its discharge end carries an integral filter seating tube 46 the outer end of which terminates in a plane inclined appreciably to the tube axis. Diametrically opposed portions 47, 48 of the inner wall of the tube are made considerably thicker than the remainder of the wall throughout the length of the tube 46. By reason of these thickened portions of the side wall, these parts of tube 46 are relatively non-flexible and therefore serve in lieu of the metal strips described in the other embodiments of the invention.

The inlet end of a filter bag 49 is provided with a relatively stiff tube 50 having an internal diameter slightly less than the external diameter of tube 46. The outer end of the inlet is notched at 51 to receive abutment 52 formed on the outer wall of the adapter tube for the same purpose described in connection with the similar notch 29 and abutment 28 of the first embodiment. The inner end of collar 50 is cut to conform with the biased end of the adapter tube and, in addition, its lateral sides are cut-away as indicated at 53 for the same purposes as similar cut-away portions 30 and 30' in the first two embodiments. The biased end of tube 50 will normally abut the inner edge of bead 54 parallel to the biased end of tube 46 so as to lock the filter in place on the adapter.

To remove the filter, the operator grasps tube 46 at thickened portions 47, 48 and at a point between the bellows and the filter inlet. This causes the tube to partially collapse throughout its length. The filter can then be withdrawn. The cammed edges of notches 53 on the inner end of collar 50 serve to guide the collar over bead 54 as will be readily understood.

Replacement of the filter is greatly facilitated by the construction just described since the upper protruding end of the adapter acts as a pilot to receive the inlet end of the bag and to gradually expand and guide it into position on tube 46 as the operator holds its opposite sides partially collapsed. As soon as the filter is in place, the operator releases his grasp whereupon tube 46 expands to lock collar 50 securely in place with the inner end resting against bead 54 and with notch 51 against abutment 52.

It will be appreciated that the invention can be embodied in various other modifications without departing from the spirit thereof. For example, while the several forms are illustrated as utilizing circular adapters, it is manifest that the tubular clamp may be of various tubular configurations so long as the internal perimeter of the bag inlet is no greater or slightly less than the external perimeter of the clamping portion of the adapter. Likewise various other expedients may be resorted to for collapsing the clamp when withdrawing or replacing the filter. Although only one embodiment of the coupling has been illustrated with a beveled end, it will be obvious that the ends of the other couplings can be so formed if desired.

It is to be understood that the protection herein applied for is not confined to the particular combinations of features or elements set out in the following claims. Protection is herein applied for for any one or more of the features or elements referred to in the following claims, or described in the foregoing specification or shown in the accompanying drawings, either independently or in combination.

I claim:

1. A self-clamping coupling for a filter bag comprising a flexible, resilient tubular member having an inlet end adapted to be connected to the exhaust of a suction cleaner and an outlet end having a smooth outer filter seating surface, the wall of said outlet end having sufficient elastic rigidity to grip the slightly smaller diameter inlet end of a filter bag telescoped thereover firmly and in an air-tight manner, said member having manually operable means secured to the outlet end of said member for collapsing one wall thereof toward the opposite wall so as to reduce the cross-sectional area of said outlet to facilitate replacement of a filter inlet thereover, said means extending longitudinally of said outlet and including a portion accessible to the hands of an operator at a point spaced from said smooth outer surface so that the operator can apply pressure thereto to collapse said outlet end inwardly toward the axis thereof while leaving the entire outlet end free of obstructions for the placement or removal of a filter bag.

2. In a bag mounting for a suction cleaner filter bag, a flexible resilient tubular member having an inlet end adapted to communicate with the exhaust of a suction cleaner and its opposite end adapted to provide a self-acting clamp and seat for the inlet end of a filter bag, U-shaped members having one leg extending longitudinally along opposite sides of said bag seat end of said member and having their other leg extending beyond and spaced from the inlet end of the filter when it is in place on said mounting, said last-mentioned legs being operable when pressed toward one another to distort the bag seat portion of said tubular member to facilitate placement or removal of a filter.

3. A self-clamping coupling for a filter bag as defined in claim 1 wherein said manually operable means for collapsing said resilient tubular member comprises a pair of relatively rigid and narrow strips extending longitudinally along the opposite side walls of said tubular member and include a pair of finger contact areas positioned on the opposite sides of said tubular member at points spaced from said filter seating surface so that the operator can apply pressure thereto to collapse said outlet end inwardly toward the axis thereof.

4. A self-clamping coupling for a filter bag as defined in claim 1 wherein the inlet end of said resilient tubular member comprises a thin-walled tube corrugated circumferentially thereof to provide a flexible bellows, said outlet end being integral with one end of said bellows and forming a continuation thereof, the opposite side walls of said outlet end being relatively thick and rigid in comparison with the intervening relatively thin and flexible side wall portions of said outlet end, said relatively thick and rigid portions terminating closely adjacent the junction of said bellows and outlet end and at a point spaced from the inlet end of a filter bag seated on said outlet end to provide finger contact areas whereby an operator can apply pressure thereto to collapse the walls of said outlet end inwardly toward one another to facilitate the placement or removal of a filter bag.

5. A self-clamping coupling for a filter bag as defined in claim 1 wherein said outlet end terminates in a plane at an angle to the axis of said resilient tubular member to provide a pilot for guiding and gradually expanding the inlet of a filter bag as said inlet is being telescoped into seating position on said outlet end.

6. A self-clamping coupling for a filter bag as defined in claim 1 wherein said inlet end is corrugated circumferentially thereof to provide a flexible bellows having one end integral with said outlet end, and wherein said portion of the manually operable means accessible to the hands of an operator includes a finger contact area closely adjacent the junction of said flexible bellows and of said outlet end, said finger contact area being positioned so as to be exposed and uncovered by the inlet of a filter seated on said outlet end whereby the filter contact area can be contacted with the fingers to collapse the wall of said outlet end inwardly toward the axis thereof without depressing the wall of the filter inlet.

7. A self-clamping coupling for a filter bag as defined in claim 1 wherein the outlet end of said flexible tubular member is cut off at an angle to the longitudinal axis of said member to provide a pilot for guiding and gradually expanding the inlet of a filter bag as said inlet is being telescoped into seating position on said outlet end, and wherein the inlet end of said tubular member is corrugated circumferentially thereof to provide a flexible bellows integral with said outlet end whereby said tubular member flexes readily and freely at the bellows portion thereof when said coupling is in use.

8. A self-clamping coupling for a filter bag as defined in claim 1 wherein the said outlet end of the resilient tubular member is cut off at an angle to the longitudinal axis of the tubular member to provide a pilot for guiding the inlet end of a filter bag thereonto, the exterior rim of said outlet end having one or more beads projecting therefrom and extending along the rim of said outlet end to provide a stop cooperating with the interior end of a tubular filter inlet when seated on said resilient self-clamping coupling and preventing the withdrawal of the filter until said coupling is again collapsed to disengage the filter inlet.

GEO. A. BRACE.

References Cited in the file of this patent

UNITED STATES PATENTS

| Number | Name | Date |
|---|---|---|
| 298,321 | Stuck | May 6, 1884 |
| 1,165,449 | Rietz | Dec. 28, 1915 |
| 2,159,116 | Zacharias | May 23, 1939 |
| 2,366,067 | Smith | Dec. 26, 1944 |
| 2,405,170 | Troxler | Aug. 6, 1946 |